US010368136B1

(12) United States Patent
Qureshi et al.

(10) Patent No.: US 10,368,136 B1
(45) Date of Patent: Jul. 30, 2019

(54) RESOURCE MANAGEMENT FOR VIDEO PLAYBACK AND CHAT

(71) Applicant: Amazon Technologies, Inc., Seattle, WA (US)

(72) Inventors: Aneeb Naveed Qureshi, Seattle, WA (US); Adam Paul DeRusha, Tacoma, WA (US); David James Roy Erdmann, Edmonds, WA (US); Samuel Scott Gigliotti, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 175 days.

(21) Appl. No.: 14/973,069

(22) Filed: Dec. 17, 2015

(51) Int. Cl.
| *H04N 7/173* | (2011.01) |
| *H04N 21/4788* | (2011.01) |
| *H04H 60/32* | (2008.01) |
| *H04H 60/59* | (2008.01) |
| *H04L 29/08* | (2006.01) |
| *H04N 21/2385* | (2011.01) |
| *H04N 21/262* | (2011.01) |
| *H04N 21/647* | (2011.01) |
| *H04N 21/2187* | (2011.01) |
| *H04N 21/2389* | (2011.01) |
| *H04N 21/81* | (2011.01) |
| *H04N 21/2365* | (2011.01) |

(52) U.S. Cl.
CPC ........ *H04N 21/4788* (2013.01); *H04H 60/32* (2013.01); *H04H 60/59* (2013.01); *H04L 29/08954* (2013.01); *H04N 21/2187* (2013.01); *H04N 21/2385* (2013.01); *H04N 21/2389* (2013.01); *H04N 21/26216* (2013.01); *H04N 21/64738* (2013.01); *H04N 21/812* (2013.01); *H04N 21/23655* (2013.01)

(58) Field of Classification Search
CPC ...................... H04N 21/23655; H04N 21/2385
USPC ...................................................... 725/94–97
See application file for complete search history.

(56) References Cited

U.S. PATENT DOCUMENTS

| 8,832,193 | B1 * | 9/2014 | Lindberg | H04L 65/60 348/14.12 |
| 10,105,596 | B1 * | 10/2018 | Mann | A63F 13/34 |
| 10,187,666 | B2 * | 1/2019 | Chang | H04H 20/71 |
| 2007/0260724 | A1 * | 11/2007 | Rowley | G06Q 10/10 709/223 |
| 2008/0209330 | A1 * | 8/2008 | Cruver | G06F 15/16 715/733 |
| 2009/0073879 | A1 * | 3/2009 | Guillouard | H04L 41/0896 370/235 |
| 2009/0175235 | A1 * | 7/2009 | Spinar | H04W 72/1294 370/329 |
| 2010/0158109 | A1 * | 6/2010 | Dahlby | H04N 7/17318 375/240.03 |
| 2010/0205541 | A1 * | 8/2010 | Rapaport | G06Q 10/10 715/753 |

(Continued)

*Primary Examiner* — Pankaj Kumar
*Assistant Examiner* — Sahar A Riaz
(74) *Attorney, Agent, or Firm* — Weaver Austin Villeneuve & Sampson LLP

(57) ABSTRACT

Techniques are described for allocation hardware and/or bandwidth resources of a viewer device between a live streaming media content playback of a video player and a concurrently provided live chat. For example, the bandwidth used by the live chat can be adjusted based on the playback of the video player.

20 Claims, 9 Drawing Sheets

(56) References Cited

U.S. PATENT DOCUMENTS

| | | | |
|---|---|---|---|
| 2011/0105226 A1* | 5/2011 | Perlman | A63F 13/12 |
| | | | 463/30 |
| 2011/0191681 A1* | 8/2011 | Stark | G06Q 10/10 |
| | | | 715/716 |
| 2012/0002614 A1* | 1/2012 | Ekici | H04W 48/18 |
| | | | 370/329 |
| 2012/0268553 A1* | 10/2012 | Talukder | H04L 12/1818 |
| | | | 348/14.08 |
| 2012/0278464 A1* | 11/2012 | Lehane | H04L 12/1407 |
| | | | 709/223 |
| 2013/0100955 A1* | 4/2013 | Dunlap | H04L 47/76 |
| | | | 370/392 |
| 2013/0130642 A1* | 5/2013 | Joul | H04L 41/5029 |
| | | | 455/406 |
| 2013/0159449 A1* | 6/2013 | Taylor | G06F 15/167 |
| | | | 709/212 |
| 2013/0166623 A1* | 6/2013 | Stanwood | H04W 4/00 |
| | | | 709/202 |
| 2014/0123014 A1* | 5/2014 | Keen | H04L 51/046 |
| | | | 715/719 |
| 2014/0280952 A1* | 9/2014 | Shear | H04L 47/70 |
| | | | 709/226 |
| 2015/0082366 A1* | 3/2015 | French | H04N 21/6371 |
| | | | 725/116 |
| 2015/0092544 A1* | 4/2015 | De Pasquale | H04W 16/14 |
| | | | 370/230 |
| 2015/0215365 A1* | 7/2015 | Shaffer | H04L 65/80 |
| | | | 370/252 |
| 2015/0319505 A1* | 11/2015 | Patadia | H04N 21/23614 |
| | | | 725/34 |
| 2016/0080502 A1* | 3/2016 | Yadav | H04L 41/12 |
| | | | 709/227 |
| 2016/0173825 A1* | 6/2016 | Polyakov | H04N 7/155 |
| | | | 348/14.03 |
| 2017/0024680 A1* | 1/2017 | Allison | G06Q 10/063112 |
| 2017/0078451 A1* | 3/2017 | Wills | H04L 47/2441 |
| 2017/0171271 A1* | 6/2017 | Kelly | H04L 65/60 |

* cited by examiner

RESOURCE MANAGEMENT FOR VIDEO PLAYBACK AND CHAT

BACKGROUND

Consumers have an ever-increasing array of options for consuming media content, in terms of the types of media content (e.g., video, audio, text, etc.), providers of the media content, and devices for consuming the media content. Media content providers are becoming increasingly sophisticated and effective at providing media content quickly and reliably to consumers.

Some media content can be "live streamed" in which media content covering an event (e.g., sales pitch, infomercial, sports game, news, etc.) is delivered live over the Internet. Often, viewers of the live streamed media content can interact with each other using a live chat. Unfortunately, the playback of the media content and the presentation of the chat compete for the same bandwidth and hardware resources of a viewer's device, resulting in degradation of the playback of the media content.

DETAILED DESCRIPTION

This disclosure describes techniques for implementing resource management for video playback and chat. For example, media content (e.g., video) can be "live streamed" in which the media content covering an event is delivered live over a network such as the Internet. Viewers watching the media content on a video player at the same time can also concurrently engage with each other through a live chat available during the live streaming of the media content. However, both the video playback and live chat compete for the same bandwidth and hardware resources of a viewer device. If the live chat uses a significant amount of the viewer device's CPU capacity or bandwidth, then the playback of the media content can degrade. For example, frames of the media content can be dropped, resulting in an erratic viewing experience, or the quality level of the playback of the media content can be reduced, resulting in a lower quality viewing experience.

As described herein, a resource controller can monitor the resource usage of the video player and live chat and then adjust the resource usage of one of the components to improve performance of the other component. As an example, if the bandwidth available to the video player reduces such that it lowers the quality level of the playback, the resource controller can reduce the amount of bandwidth allocated to the live chat by reducing the polling interval in which the live chat receives new chat entries or reduce the number of messages received to be displayed within the live chat. As a result, more bandwidth is available to the video player and the quality level of the playback can increase.

Figure 1:
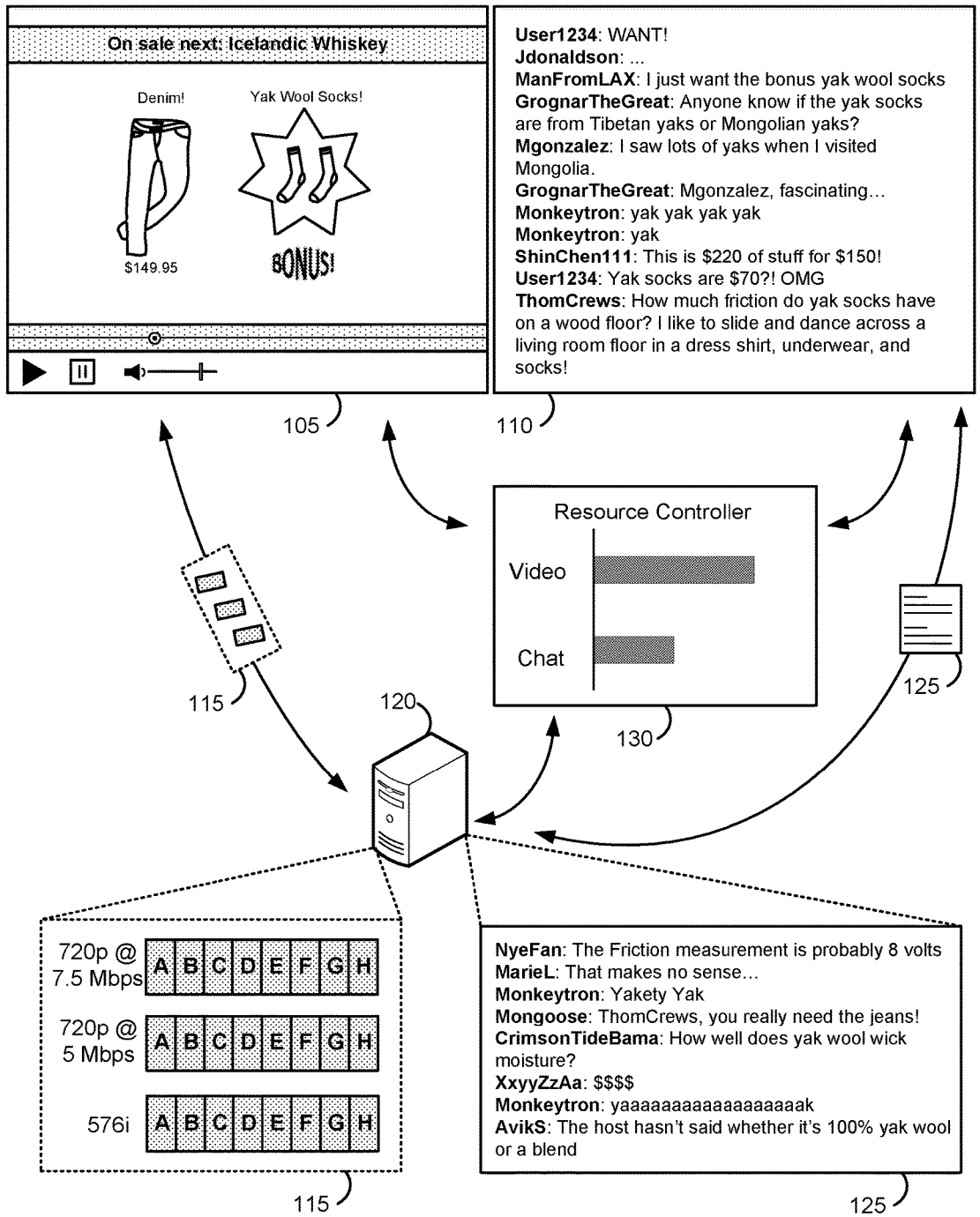
FIG. 1 illustrates an example of resource management for video playback and chat.

In more detail, FIG. 1 illustrates an example of resource management for video playback and chat. In FIG. 1, video player 105 and chat 110 are components providing video playback and chat entries, respectively, during a live stream of media content portraying an event such as a home shopping showcase of a product for purchase.

In a live streaming scenario, video player 105 receives manifest data from media server 120 to enable playback of the media content. The manifest data can be provided in one or more files (such as markup files or other types of data structures) providing playback options for the live streaming of the media content. For example, the manifest file includes metadata indicating fragments, or segments, of a short duration of the playback of the media content being live streamed available at different quality levels based on bitrates and/or resolutions. The metadata allows the viewer device to generate properly formatted requests for specific fragments of the media content. Audio portions of the media content can also be provided in fragments. Additional information, such as available subtitles, content delivery networks (CDNs) to use, etc. can also be provided in the manifest file.

As video player 105 receives manifest files and requests fragments for playback, new fragments can also be generated at media server 120 and corresponding new manifest files can be provided to video player 105 to provide playback options for the new fragments. New manifest files providing playback options for new fragments of the media content can be provided during the entire live streaming of the event.

For example, in FIG. 1, fragments A-D can be requested at 720p at 2.5 megabits per second (Mbps), 720p at 5 Mbps, or 576i quality levels. Using the metadata in the manifest file and the availability of hardware and bandwidth resources of the viewer device implementing video player 105, fragments A-D can be requested at those quality levels for playback. When fragments E-H are generated (e.g., encoded into the aforementioned quality levels from the output of a camera recording the event), a new manifest file can provide the playback options for fragments E-H. As a result, a stream of fragments 115 can be requested and received by video player 105 as the live streaming occurs.

At the same or similar time, chat 110 receives chat entries 125 from media server 120. Chat entries 125 include textual or graphical responses from viewers using other viewer devices live streaming the same media content. That is, chat 110 provides interactive content from other viewers watching the same content. The content can be a live stream of an event or a premiere of pre-recorded content that is live streamed. Media server 120 receives chat entries from viewer devices and periodically "pushes" new chat entries to chat 110 in accordance with a polling interval indicating an amount of time that should elapse between providing new chat entries.

A shorter polling interval provides a more responsive conversation among the viewers. However, shortening the polling interval (i.e., reducing the time duration) can result in an increase in the amount of the communications bandwidth (e.g., the bandwidth of the Internet connection used by the viewer device contacting media server 120) used by chat 110. Additionally, if a large number of viewers are providing chat entries, then a large amount of data (i.e., the chat entries) may need to be downloaded from media server 120 which also results in an increase in the bandwidth used by chat 110. If chat 110 uses too much bandwidth, then the performance of the playback of video player 105 might degrade. For example, video player 105 might downgrade its playback by switching from requesting fragments at 720p at 7.5 Mbps to 576i (i.e., a lower quality level). Audio quality might also degrade in a similar manner.

Moreover, chat entries 110 might include content that can be computationally intense, and therefore, require more of the central processing unit (CPU) or other hardware resources (e.g., memory) of the viewer device. For example, rendering the text or images of chat entries can require an increase in the hardware resources of the viewer device to accomplish the task. If video player 105 does not have enough access to the capabilities of the hardware resources of the viewer device, playback of the live stream may experience interruptions or anomalies such as, for example, dropped frames that can result in a jerky and unpleasant playback.

In FIG. 1, resource controller 130 can allocate the available hardware and bandwidth resources of the viewer device between video player 105 and chat 110. For example, if video player 105 downgrades to requesting fragments of media content at a lower quality level, resource controller 130 can receive an indication representing that the downgrade occurred. Resource controller 130 can then inform chat 110 that it should use less bandwidth, or resource controller 130 can contact media server 120 to inform it that chat 110 should use less bandwidth. For example, the polling interval for providing chat entries 125 can be adjusted or the number of chat entries provided can be adjusted to reduce the amount of the bandwidth that chat 110 is using so that video player 105 can have more bandwidth available, and therefore, be able to transition back to requesting higher quality fragments for playback. Likewise, if video player 105 experiences dropped frames, then resource controller 130 can inform chat 110 to use less hardware resources (or inform media server 120 that chat 110 should use less resources), and therefore, the content of the chat entries can be adjusted (e.g., render the text differently, render images in a lower quality format, etc.) such that more of the hardware resources are available for video player 105.

Figure 2:
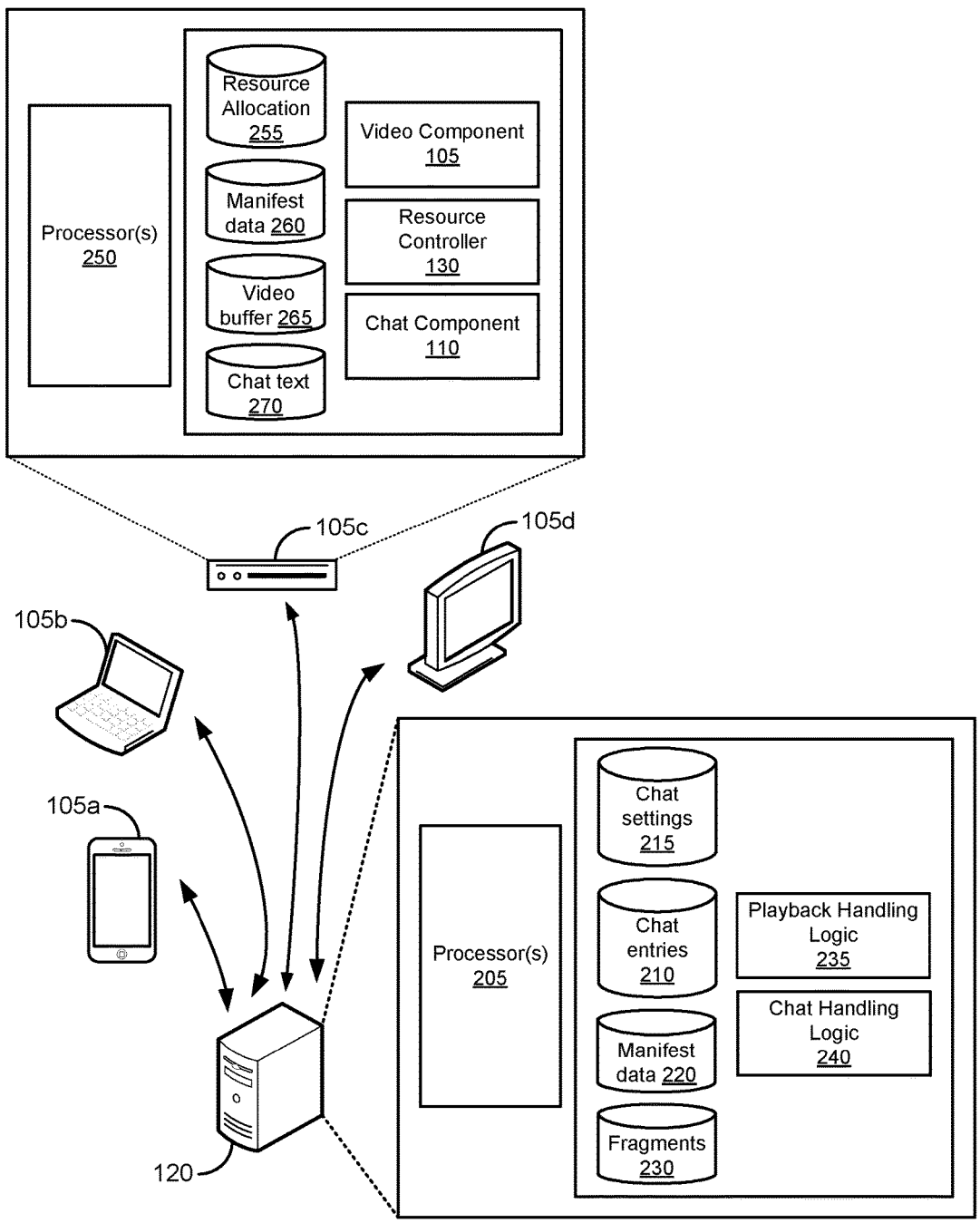
FIG. 2 illustrates an example of a computing environment for resource management for video playback and chat.

FIG. 2 illustrates an example of a computing environment for resource management for video playback and chat. The computing environment of FIG. 2 includes media server 120 which can be used to provide live streaming media content and chat entries for playback on viewer devices 105*a*-*d*. Viewer device 105*a* is a smartphone, viewer device 105*b* is a laptop, viewer device 105*c* is a set-top box, and viewer device 105*d* is a television. Other types of viewer devices such as desktop computers, video game consoles, tablets, wearable devices, virtual reality headsets, etc. may also be included in the computing environment.

It should be noted that, despite references to particular computing paradigms and software tools herein, the computer program instructions on which various implementations described herein are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 120 can be part of a content delivery system that conforms to any of a wide variety of architectures. The functionality and components of media server 120 can use one or more servers and be deployed at one or more geographic locations (e.g., across different countries, states, cities, etc.) using any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein also may be implemented by one or more of different entities. For example, the functionality to provide playback of media content can be integrated into a video player or software client under control of one entity (e.g., on viewer devices 105*a*-*d*), integrated into a separate app from another entity, implemented in an edge server or content server of a CDN, a server of an ISP, etc.

Media server 120 can include processor(s) 215, memory, and various types of logic used to provide live streaming media content for playback at viewer devices 105*a*-*d* and live chat entry content for display at viewer devices 105*a*-*d*. In FIG. 2, media server 120 can receive chat entries from viewer devices 105*a*-*d* and store chat entries in chat entries 210. Chat settings 215 can store data indicating the polling interval for viewer devices 105*a*-*d* (e.g., different viewer devices might have different polling intervals) as well as data that can be used to determine which chat entries have already been provided to the viewer devices. Manifest data 220 can include the metadata used to provide manifest files to viewer devices 105*a*-*d*. Fragments 230 can store fragments of the media content available to be requested by viewer devices 105*a*-*d* for playback. As the live stream is recorded, more fragments may be generated and stored in fragments 230 and corresponding metadata in manifest data 220 can also be generated. Playback handling logic 235 can process requests from viewer devices 105*a*-*d* for manifest files and fragments and provide the requested data from manifest data 220 or fragments 230. Chat handling logic 240 can process data in chat settings 215 to determine when to provide new chat entries in chat entries 210 to a viewer device based on the polling intervals, as previously discussed. In some implementations, chat handling logic 240 can be handled by a separate entity than the entity providing the fragments of the media content.

Viewer devices can include processor(s) 250, memory, and various types of logic used to provide playback of a live stream of media content and provide a chat for the live stream. In FIG. 2, viewer device 105*c* can receive chat entries provided by viewer devices 105*a*, 105*b*, and 105*d* from chat entries 210 of media server 120 and store the chat entries in chat text 270 for display with chat 110. Manifest files (or metadata from the files) received from media server 120 can be stored in manifest 260 and the fragments requested using the manifest data can be stored in video buffer 265. The fragments in video buffer 265 can be used by video player 105 for playback. Other types of data, such as audio fragments, can also be stored in similar buffer memories. Resource controller 130 can set the hardware and bandwidth resources allocated to video player 105 and chat 110 and store data representing the allocations in resource allocation 255.

In FIG. 2, resource controller 130 is shown as a separate component from video player 105 and chat 110. However, in some implementations, resource controller 130 can be integrated with (i.e., part of) video player 105 or integrated with chat 110, or within both video player 105 and chat 110. For example, video player 105 can be a "master" component with chat 110 being a "slave" component being directed by the resource controller 130 of video component 105 to reduce its use of bandwidth or hardware resources. In some implementations, resource controller can be implemented within media server 120. For example, media server 120 can implement resource controller 130, receive data from both video player 105 and chat 110 regarding their resource usage, and then provide data indicating allocations for the respective components, as disclosed herein. In some implementations, some of the functionality of resource controller 130 can be implemented within both a viewer device and media server 120. As a result, the implementations described herein can be implemented within different combinations of components of viewer devices and media server 120. In some implementations, video player 105 and chat 110 can be integrated together, for example, in the same program, browser, etc.

Figure 3:
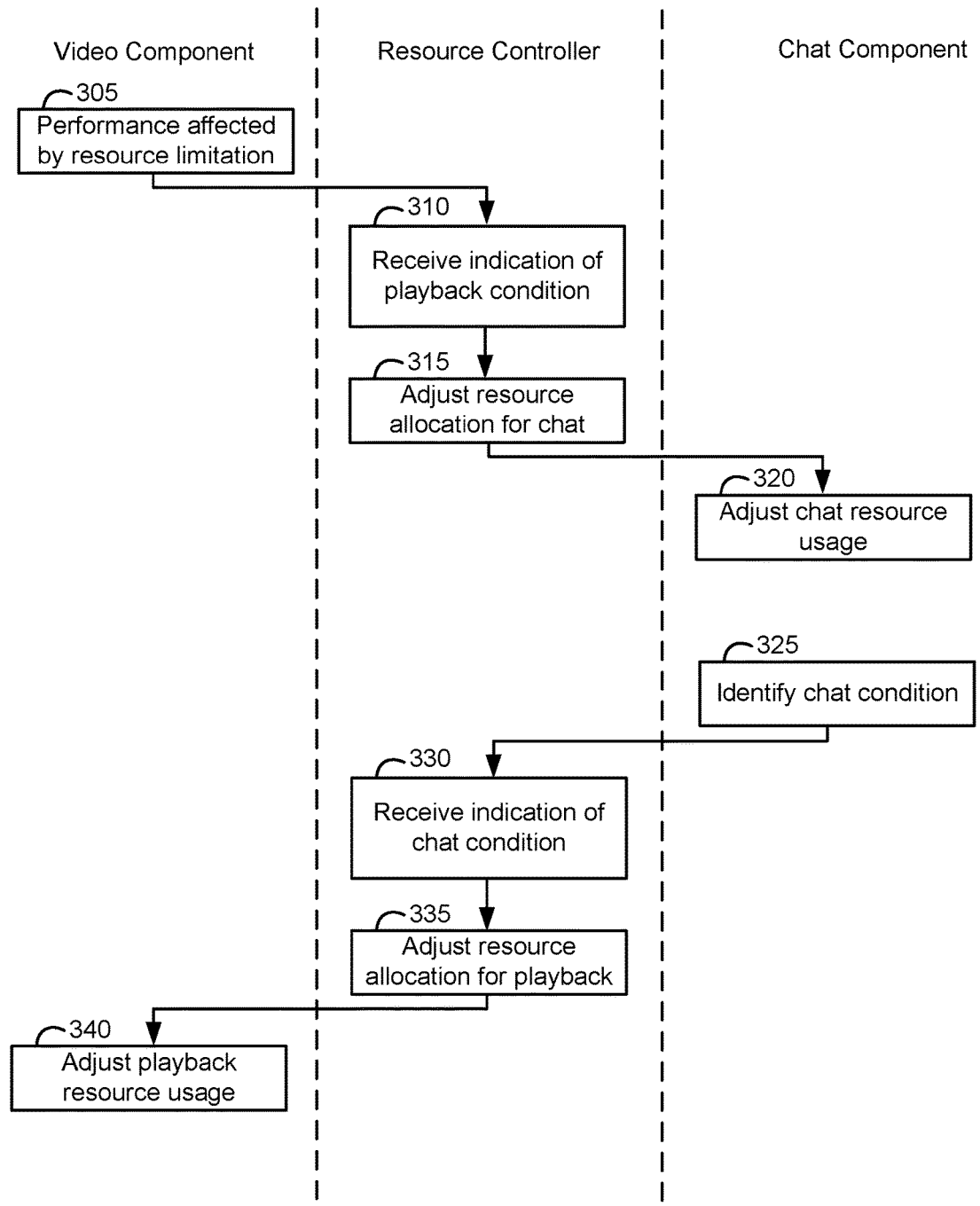
FIG. 3 is a flowchart illustrating resource management for video playback and chat.

A specific implementation will now be described with reference to FIG. 1, the computing environment of FIG. 2, and the flow diagram of FIG. 3. In FIG. 3, a viewer device (e.g., one of viewer devices 105*a*-*d*) can be playing back a live stream of media content from media server 120. During the playback of the media content, the performance can be affected by a limitation of the available hardware (e.g., CPU capacity) or network bandwidth (e.g., of the communication link such as the Internet connection used by the viewer device to communicate with media server 120) resources of the viewer device (305).

For example, a viewer device can use a heuristic algorithm to implement adaptive bitrate streaming for the live streaming of the media content. Adaptive bitrate streaming includes determining the viewer device's available bandwidth and hardware capabilities in real time and adjusting the quality of the media content that is requested from media server 120 and played back on the viewer's device to account for changes in the available bandwidth and hardware resources. As previously discussed, fragments at different quality levels (at various bitrates and/or resolutions) of the media content detailed in a manifest file are requested individually and stored in a buffer for playback. As a result, the video player can switch from requesting higher quality fragments to lower quality fragments of the media content as the available bandwidth to the viewer device decreases to avoid rebuffering (i.e., when the buffer storing the fragments for playback is drained faster than fragments can be received from the media server).

As another example, if the available CPU capacity decreases such that the playback of higher quality fragments results in (or would result in) frames being dropped (i.e., frames of the media content playback are being skipped), then lower quality fragments can also be requested to take into account the decrease in the available CPU capacity for the video player to use.

The video player can provide the resource controller with data indicating that the playback has been affected due to a reduction in available resources resulting in a change in the quality level of fragments being requested for playback or that the video player has experienced dropped frames (310). In response, the resource controller can adjust the allocation of resources for the live chat to account for playback being affected (315). For example, the amount of the available bandwidth can be shifted from 80% to the video player and 20% to the chat, to 90% to the video player and 10% to the chat. As a result, the resource controller can inform that the chat component should reduce its bandwidth usage (320). This can allow for the video player to request for higher quality fragments using the extra available bandwidth. In another example, media server 120 can be contacted to adjust the providing of the chat entries to the chat component, either by the chat component itself or by the resource controller.

Figure 4:
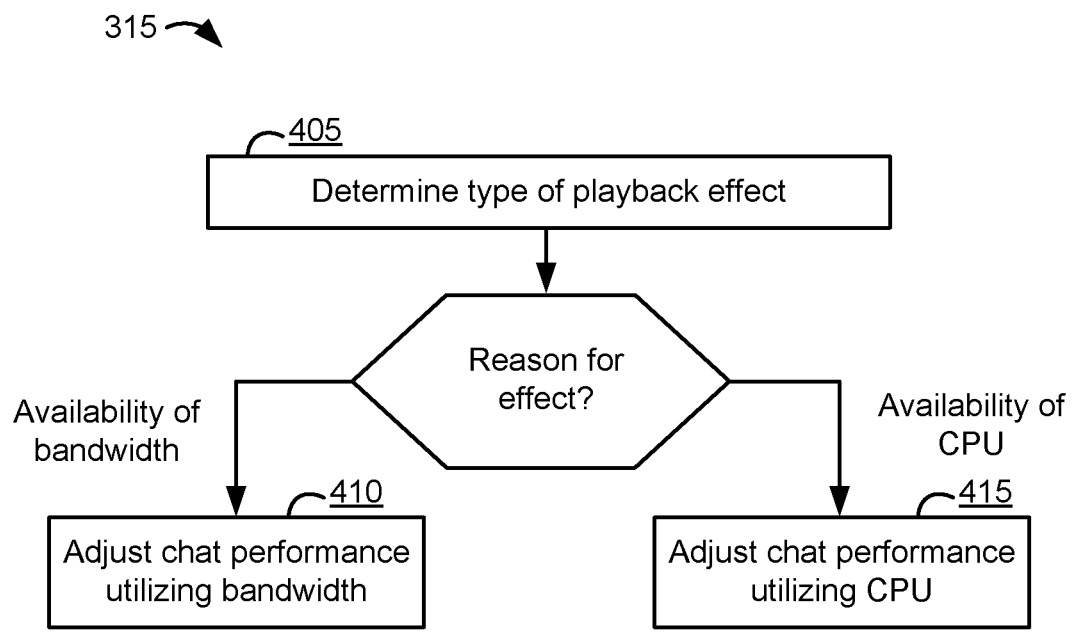
FIG. 4 is a flowchart illustrating adjusting resource usage.

As illustrated in the flowchart of FIG. 4, the type of resource to be reallocated between the video player and live chat can be determined based on how playback of the content by the video player was affected. The type of condition or effect impacting playback of the media content is determined (405). If playback was affected due to a reduction in the available bandwidth for the video player (e.g., as indicated by the video player downgrading the quality level of requested fragments) the performance of the live chat can be adjusted such that it reduces its use of the bandwidth (410). As a result, more bandwidth can be available and the video player can then request higher quality level fragments.

Figure 5A:
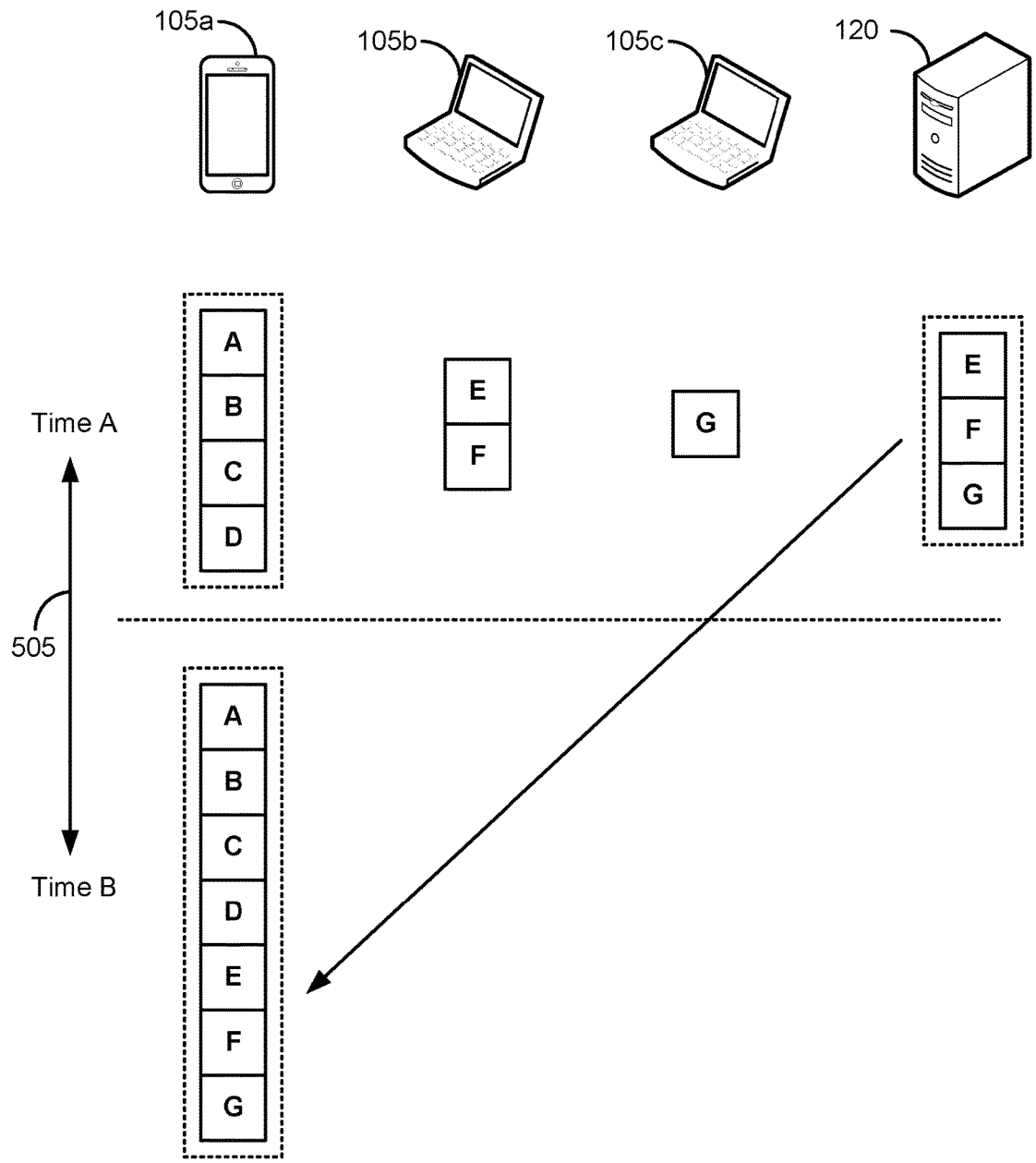
FIGS. 5A-C illustrate examples of adjusting bandwidth used by a live chat component.
Figure 5B:
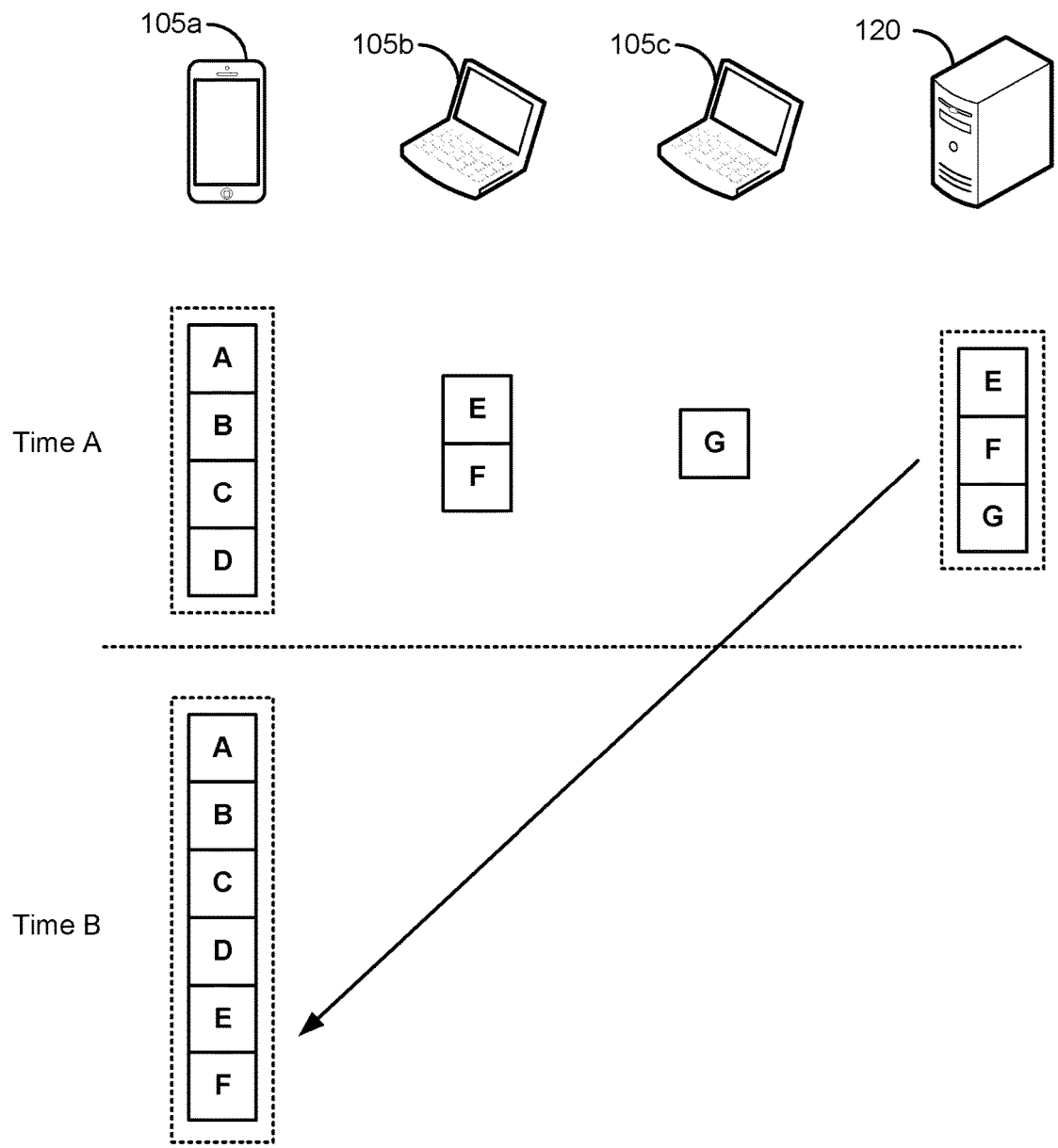
Figure 5C:
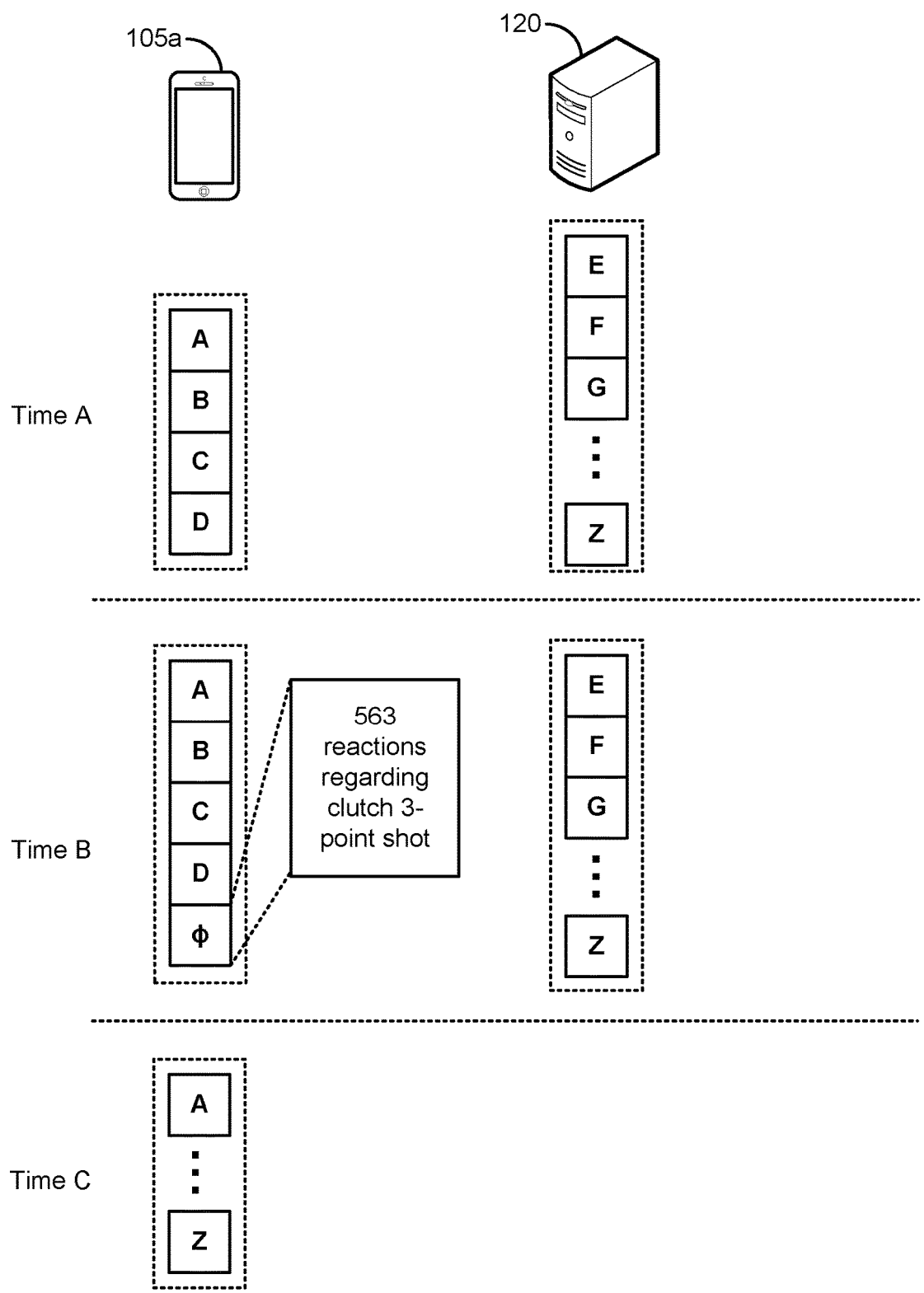

FIGS. 5A-C illustrate examples of adjusting bandwidth used by a live chat component. In FIG. 5A, polling interval 505 between time A and time B can be adjusted (e.g., increased in time) to reduce the amount of the bandwidth used by the chat. For example, in FIG. 5A, chat entries A-D might be received and displayed at viewer device 105*a* at time A. Also at or after time A, but before time B, viewer devices 105*b* and 105*c* might provide chat entries E-G to media server 120. Chat entries E-G can be provided to viewer device 105*a* at time B. That is, new chat entries can be provided to viewer device 105*a* at a time corresponding to polling interval 505 after time A. By increasing the time of polling interval 505, the amount of bandwidth used by the chat can be decreased, resulting in the freed up bandwidth being available for the video player to increase the quality level of the fragments requested. The viewer device can request that the duration of polling interval 505 should be increased to reduce the amount of bandwidth used by the chat.

In FIG. 5B, the number of chat entries provided to the viewer device can be reduced to free up bandwidth. For example, in FIG. 5B, chat entries E-G are provided by viewer devices 105*b* and 105*c* and stored at media server 120. At time B (the next polling interval after time A), new chat entries are available for transmission to viewer device 105*a*. However, rather than providing each of the new chat entries to viewer device 105*a*, media server 120 can cull the chat entries such that only a limited number of chat entries are to be provided to viewer device 105*a*. For example, media server 120 might prioritize or rank chat entries (e.g., using quality metrics) and provide higher prioritized or ranked chat entries to viewer device 105*a*. As a result, in FIG. 5B, chat entries E and F are provided to viewer device 105*a*, but chat entry G is not provided to reduce the amount of data transferred. The chat component or resource controller of the viewer device can alert media server 120 that it should reduce the number of chat entries to be provided at the next polling interval to reduce the amount of bandwidth used by the chat.

In FIG. 5C, chat entries can be summarized and provided as fewer chat entries. For example, in FIG. 5C, at or after time A and before time B, chat entries E-Z are received at media server 120. However, at time B, rather than sending each of chat entries E-Z, the chat entries can be analyzed and a summary chat entry can be provided to viewer device 105*a* to reduce the amount of bandwidth used by the chat. That is, rather than providing a large number of chat entries that can take use a significant amount of the bandwidth available to viewer device 105a, fewer chat entries using less data can be provided. For example, media server 120 can determine whether the number of chat entries is above a threshold number, and if so, generate a summary regarding chat entries E-Z. In some implementations, if chat entries E-Z are determined to be related to a similar scene or activity during the event (e.g., they are in response to a basketball player making a clutch three-point shot), the chat entry providing the summary can indicate the number of chat entries related to that scene. In some implementations, a statistical summary of chat entries E-Z can be provided. For example, a summary chat entry can indicate the percentage of positive and/or negative reactions of chat entries E-Z using sentiment analysis. If the viewer wants to review the chat entries corresponding to the summary chat entry, the summary chat entry can be selected, or the viewer may otherwise indicate a desire to view the chat entries, and therefore, at time C, the chat entries that were summarized can be provided. That is, the chat entries can be provided if the viewer expresses an interest in reviewing chat entries regarding a similar topic.

The amount by which the bandwidth available to live chat is reduced may depend on the drop in quality of the content playback. For example, if the video player is providing playback of the live stream of the media content at a 720p at 5 Mbps quality level and decreases to 576i, the resource controller might reduce the bandwidth allocated to the chat less than if the media content reduced from a 720p at 7.5 Mbps quality level to the 576i quality level. In some implementations, the polling interval and number of chat entries can be similarly adjusted.

Referring back to FIG. 4, if playback of the media content was affected due to a reduction in the available CPU capacity (or other hardware resources such as memory) for the video player, such as when the video player experiences dropped frames, then the performance of the live chat can be adjusted such that it reduces its use of the CPU (415). As a result, more CPU capacity can be available and video player can then request higher quality level fragments without having to switch to lower quality fragments to reduce dropped frames.

Various chat performances or capabilities can be adjusted to reduce the load on the CPU. For example, the chat can do a simpler rendering of the content of the chat entries (e.g., simpler rendering of text, images, etc.). In some implementations, if chat entries include images, then the images can be scaled down in size, or even not displayed at all. For example, a link or button (or other graphical user interface (GUI) element) might be provided for an image such that it is not rendered unless selected. In some implementations, the chat entries can be received, but they may not be displayed to reduce the amount of rendering. Rather, a summary chat entry (e.g., as described above) can be generated locally and displayed.

The previous examples describe reducing the allocation of hardware and bandwidth resources used by a live chat to improve the performance of media content playback by a video player (by making more of the resources available to the video player). However, the playback of the media content can also be adjusted to reduce the allocation of hardware and bandwidth resources for the video player to improve the performance of the live chat.

Referring back to FIG. 3, a chat condition resulting in the live chat needing more resources can be identified (325). For example, a user might be engaged in the live chat, interacting with other viewers providing chat entries from other viewer devices. As a result, the performance of the chat might rise in importance to the viewer as they are not only viewing the playback of the live streaming media content, but also engaging in conversation with other viewers. That is, some of the viewer's attention may be split between the video player and live chat such that the live chat might be more important than a viewer who is not engaging in the live chat (i.e., the live chat is no longer more of a supplemental experience to the primary media content playback experience). The resource controller can be informed that viewer is engaged in chatting (e.g., chat entries are being received within a threshold time period, the viewer is inputting in chat entries within time intervals of each other indicating an active conversation, the viewer is responding to specific other viewers, etc.) (330) and it can adjust the resource allocation for the playback of the media content (335). For example, the resources used by the video player in playing back the media content can be reduced by having the video player downgrade the quality level of the fragments it requests from the media server (340). In this scenario, the capabilities of the chat that result in an increase in resources can be adjusted, for example, the polling interval for the chat can then be reduced to provide a more responsive live chat.

Figure 6:
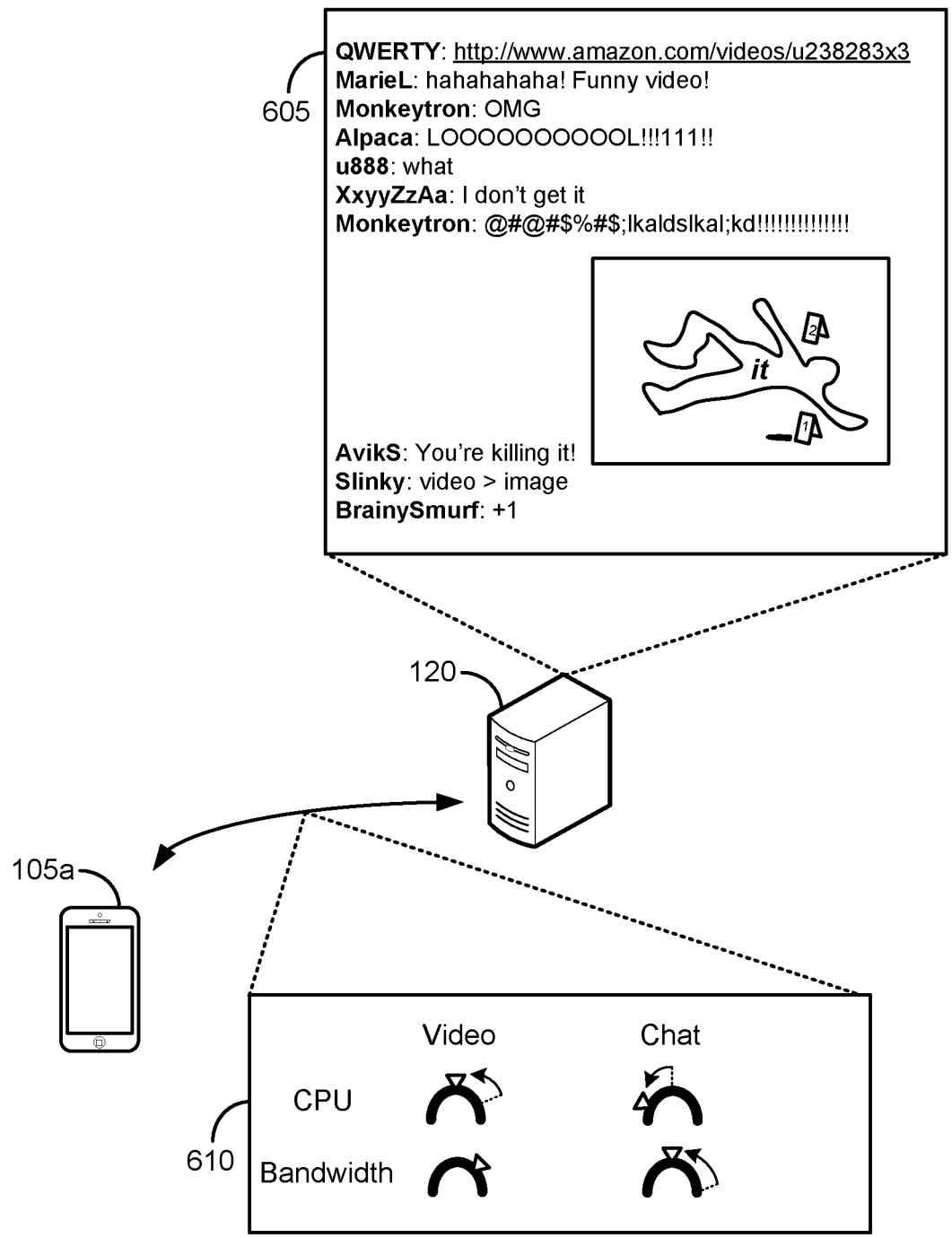
FIG. 6 illustrates an example of resource management for video playback and chat based on content of chat entries.
Figure 7:
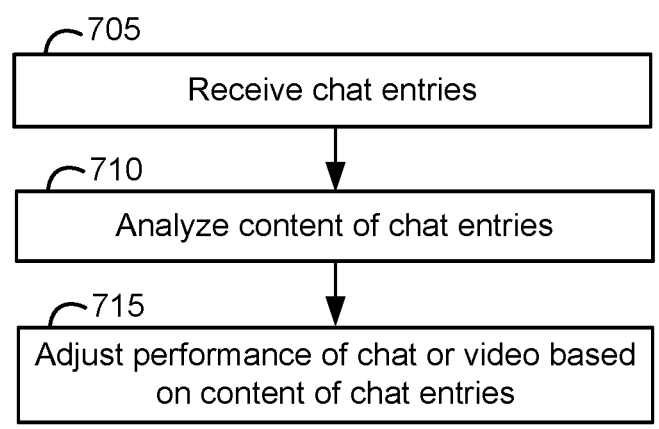
FIG. 7 is a flowchart illustrating resource management for video playback and chat based on content of chat entries.

The resources allocated to the video player and chat can also be based on the content of the chat entries. FIGS. 6 and 7 illustrate resource management for video playback and chat based on content of chat entries.

In FIG. 7, chat entries can be received from viewer devices (705). For example, in FIG. 6, chat entries 605 can be received from several viewer devices after a first polling interval corresponding to when viewer device 105a receives chat entries, but before the second polling interval. Media server 120 can analyze the content of the chat entries (710). For example, in FIG. 6, media server 120 can determine whether the textual or graphical content of the chat entries may lead to a third component competing for the same hardware and bandwidth resources of the viewer device as the video player and chat of viewer device 105a.

For example, in FIG. 6, another viewer has inserted a URL to a source for streaming media content and other viewers are responding favorably to the insertion of the URL. Media server 120 might anticipate that viewer device 105a might select the link and introduce the third component (i.e., another playback of media content corresponding to the URL). As a result, media server 120 can indicate that the performance of the video player and/or chat should be adjusted based on the content of the chat entries (715). For example, if a third component is expected to compete for the same hardware and bandwidth resources, then media server 120 can generate performance instructions 610 indicating that the CPU capacity and bandwidth allocated to the video player and chat might be adjusted. In some implementations, the content of the chat entries can be analyzed and if the viewer is anticipated to begin engaging in the live chat, then the performance of the video player can be adjusted ahead of time. For example, if one viewer is mentioning another viewer, then it can be anticipated that the other viewer might begin to engage in the chat. The adjustments can be provided to viewer device 105a before or at the next polling interval. For example, if provided at the next polling interval, the chat entries can be provided with performance instructions 610. If provided before the next polling interval, then performance instructions 610 can be provided to viewer device 105a, corresponding allocations of resources can be performed, and the new chat entries can be provided by the next polling interval.

In FIG. 6, the CPU capacity used by the video player and chat might be decreased (as shown in performance instructions 610 in FIG. 6 with the arrows indicating a decrease from an earlier allocation to the marker indicating the new allocation) while the bandwidth used by the chat might be decreased, but the bandwidth for the video player might remain the same. As a result, the third component may begin using the available bandwidth and CPU capacity without interrupting the media content playback at the video player or the live chat. In some implementations, media server 120 might adjust some of the allocations for resources on its end and provide viewer device 105a with data indicating other allocations. For example, the bandwidth used by the chat might be adjusted by media server 120 (e.g., by adjusting the polling interval), but media server 120 might generate performance instructions 610 including the bandwidth to be used by the video player of viewer device 105a.

The previous examples describe adjusting resource usage of chat and video components that are provided concurrently. However, in other implementations, other components can have their resource usage adjusted if provided concurrently with one or both of the chat and video components. For example, an advertisement may be displayed along with a video player and a live chat. The resource usage of the advertisement can be adjusted based on the performances of the video player or live chat. For example, if lower quality fragments are requested by the video player, then the advertisement can be adjusted, for example, by displaying a static image rather than a video for the advertisement, displaying another type of advertisement, etc.

Additionally, the techniques described herein can be applied to music, electronic books, or other types of players. For example, streaming music or an internet radio program can be provided with a live chat. The resource usage of the live chat can be adjusted based on the performance of the streaming music. For example, the polling interval or number of chat entries can be changed if the quality of the streaming music is reduced. As a result, the quality of the streaming music can be increased or restored.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer implemented method, comprising:
receiving, by a resource controller of a viewer device, an indication that performance of a live streaming video playback of media content has experienced: dropped frames and a quality level of fragments of the media content requested from a media server has been downgraded;
reducing, by the resource controller, central processing unit (CPU) capacity allocated to a live chat concurrently provided with the live streaming video playback of the media content in response to the performance experiencing dropped frames; and
reducing, by the resource controller, bandwidth of a communication connection of the viewer device allocated to the live chat in response to the quality level being downgraded.

2. The computer implemented method of claim 1, wherein reducing the bandwidth of the communication connection allocated to the live chat includes increasing a duration of a polling interval corresponding to when new chat entries are provided to the viewer device from the media server.

3. The computer implemented method of claim 2, further comprising:
increasing the quality level of the fragments of the media content requested from the media server for the live streaming video playback responsive to the increase of the duration of the polling interval.

4. The computer implemented method of claim 1, wherein reducing the bandwidth of the communication connection allocated to the live chat includes decreasing a number of chat entries provided to the live chat from the media server.

5. A computing device, comprising:
one or more processors and memory configured to:
determine, by the computing device, that playback of streaming media content at the computing device has degraded due to availability of resources of the computing device, the degraded playback corresponding to dropped frames of the streaming media content or a quality level of a requested fragment of the streaming media content being downgraded; and
adjust, by the computing device, capabilities of a live chat provided at the computing device concurrently with the playback of the streaming media content by reducing an allocation of central processing unit (CPU) capacity of the one or more processors for rendering text or image content of one or more received chat entries for the live chat, the adjusting of the capabilities of the live chat being in response to the determining by the computing device that playback of the streaming media content has degraded.

6. The computing device of claim 5, wherein adjusting the capabilities of the live chat further includes reducing network bandwidth used by the live chat.

7. The computing device of claim 6, wherein adjusting the capabilities of the live chat further includes increasing a duration of a polling interval corresponding to when new live chat entries are provided to the computing device, thereby resulting in reducing network bandwidth used by the live chat.

8. The computing device of claim 6, wherein adjusting the capabilities of the live chat further includes reducing a number of live chat entries provided to the live chat, thereby resulting in reducing network bandwidth used by the live chat.

9. The computing device of claim 5, wherein adjusting the capabilities of the live chat further includes reducing usage of an amount of the memory of the computing device being allocated to the live chat.

10. The computing device of claim 5, the one or more processors and memory further configured to:
increase the quality level of fragments of the streaming media content requested from the media server responsive to the adjustment of the capabilities of the live chat provided concurrently with the playback of the streaming media content.

11. The computing device of claim 5, wherein adjusting the capabilities of the live chat includes simplifying rendering of the content of the chat entries.

12. The computing device of claim 5, wherein adjusting the capabilities of the live chat includes providing a summary chat entry that summarizes a group of received chat entries that are not displayed.

13. A computer program product comprising one or more non-transitory computer-readable media having computer program instructions stored therein, the computer program instructions being configured such that, when executed by one or more computing devices, the computer program instructions cause the one or more computing devices to:
   determine, by the one or more computing devices, that playback of streaming media content at the computing device has degraded due to availability of resources of the computing device, the degraded playback corresponding to dropped frames of the streaming media content or a quality level of a requested fragment of the streaming media content being downgraded; and
   adjust, by the one or more computing devices, capabilities of a live chat provided at the one or more computing devices concurrently with the playback of the streaming media content by reducing an allocation of central processing unit (CPU) capacity of the one or more computing devices for rendering text or image content of one or more received chat entries for the live chat, the adjusting of the capabilities of the live chat being in response to the determining by the one or more computing devices that playback of the streaming media content has degraded.

14. The computer program product of claim 13, wherein adjusting the capabilities of the live chat further includes reducing network bandwidth used by the live chat.

15. The computer program product of claim 14, wherein adjusting the capabilities of the live chat further includes increasing a duration of a polling interval corresponding to when new live chat entries are provided to the computing device, thereby resulting in reducing network bandwidth used by the live chat.

16. The computer program product of claim 14, wherein adjusting the capabilities of the live chat further includes reducing a number of live chat entries provided to the live chat, thereby resulting in reducing network bandwidth used by the live chat.

17. The computer program product of claim 13, wherein adjusting the capabilities of the live chat further includes reducing usage of an amount of memory of the one or more computing devices being allocated to the live chat.

18. The computer program product of claim 13, wherein the computer program instructions further cause the one or more computing devices to:
   increase the quality level of fragments of the streaming media content requested from the media server responsive to the adjustment of the capabilities of the live chat provided concurrently with the playback of the streaming media content.

19. The computer program product of claim 13, wherein the computer program instructions further cause the one or more computing devices to adjust the capabilities of the live chat by simplifying rendering of the content of the chat entries.

20. The computer program product of claim 13, wherein the computer program instructions further cause the one or more computing devices to adjust the capabilities of the live chat by providing a summary chat entry that summarizes a group of received chat entries that are not displayed.

* * * * *